United States Patent
Kim

[19]

[11] Patent Number: 6,115,530
[45] Date of Patent: Sep. 5, 2000

[54] APPARATUS FOR DISCRIMINATING PROGRAMMED-RECORDING TAPE AND PROGRAMMED-RECORDING METHOD USING THE APPARATUS

[75] Inventor: Jae-du Kim, Suwon, Rep. of Korea

[73] Assignee: Samsung Electronics Co., Ltd., Kyungki-Do, Japan

[21] Appl. No.: 08/881,001

[22] Filed: Jun. 23, 1997

[30] Foreign Application Priority Data

Jun. 21, 1996 [KR] Rep. of Korea ................. 96-22723

[51] Int. Cl.⁷ ........................................ H04N 5/91
[52] U.S. Cl. .............................. 386/46; 360/60; 360/132
[58] Field of Search ................... 386/46; 360/25, 360/60, 69, 92, 94, 132

[56] References Cited

U.S. PATENT DOCUMENTS

| | | | |
|---|---|---|---|
| 3,848,265 | 11/1974 | Biery et al. ............................ | 360/60 |
| 4,843,490 | 6/1989 | Haragushi ............................. | 360/69 |

*Primary Examiner*—Wendy Garber
*Assistant Examiner*—Christopher Onuaku
*Attorney, Agent, or Firm*—Sughrue, Mion, Zinn, Macpeak & Seas, PLLC

[57] ABSTRACT

An apparatus is disclosed for discriminating if a video tape loaded into a VCR for use in recording according to programmed recording. A first detection switch (10) detects whether the recording safety tab is present, or if a piece of tape (70) is blocking a first side of the tab hole (60) of the video tape (50). A second detection switch (20) detects whether the recording safety tab of the video tape is present or if a piece of tape (70) is blocking a second side of the tab hole (60) of the video tape (50). A determining means (40) senses the states of the first and second detection switches (10, 20) and determines whether the video tape is a programmed recording tape, a recording protected tape, or a tape on which recordings may be freely made. A method is also disclosed to use the discriminating apparatus for ensuring that a video tape for use in programmed recording has been loaded when the VCR is in a programmed recording mode.

4 Claims, 2 Drawing Sheets

APPARATUS FOR DISCRIMINATING PROGRAMMED-RECORDING TAPE AND PROGRAMMED-RECORDING METHOD USING THE APPARATUS

BACKGROUND OF THE INVENTION

1. Field of the Invention

The present invention relates to a programmed recording of a video cassette recorder. More particularly, the present invention relates to an apparatus for discriminating at least one kind of video tape for programmed recording when a video tape is loaded in a video cassette recorder. Additionally, the present invention relates to a programmed recording method using the apparatus.

This application for a method and apparatus for discriminating programmed/recording tape is based on Korean Patent Application No. 96-22723 which is incorporated herein by reference for all purposes.

2. Description of the Related Arts

Generally, a determination of whether a video tape loaded in a video cassette recorder is a tape for recording or a tape for reproducing is carried out by sensing a recording safety tab on the video tape by use of a detection switch.

When the detection switch senses the presence of a recording safety tab on the video tape, the switch outputs a signal having "HIGH" state to a microprocessor, so that the microprocessor recognizes the high voltage and determines that the loaded tape may be used for recording. On the other hand, if the detection switch does not sense the presence of the recording safety tab, the switch outputs a signal of "LOW" state to the microprocessor, so that the microprocessor determines that the loaded tape is for reproducing only.

Programmed recording refers to a recording method in which a tape is loaded in advance and a recording time is reserved so that a recording is automatically performed at the reserved time. Programmed recording is divided into the following types: daily programmed recording, weekly programmed recording, and appointed-time (i.e., non-recurring) programmed recording. When at least one programmed recording mode is used concurrently with a normal recording mode, it is preferable to use different tapes for each recording mode and to discriminate each tape by attaching unique labels to each of the tapes.

Thus, when a user wants to make a programmed recording, the user loads an appropriate tape into the video cassette recorder after identifying the label on the tape, searches a position at which the recording is to start, which is often the position at which a previously recorded program ends, and lets the video cassette recorder be in a programmed recording stand-by mode.

However, in case that the user neither identify the label on the tape nor search a position at which the recording is to start, the programmed recording is carried out on an unintended tape since a conventional programmed recording apparatus for video cassette recorder determines only that an inserted tape is for recording or reproducing by a single detection switch and cannot distinguish between the tapes each of which has a particular intended recording use. In such cases, programs of different types are recorded on a tape so that the contents of the tape become mixed. Even worse, under such conventional practice it is possible that an important program recorded previously is overwritten by the erroneous recording.

SUMMARY OF THE INVENTION

To solve the above problems, one object of the present invention is to provide an apparatus for discriminating at least one kind of video for programmed recording when a video tape is loaded in a video cassette recorder.

Another object of the present invention is to provide a programmed recording method for determining whether a loaded tape is for a programmed recording and for recording consecutive television programs which is program-recorded continuously on the video tape.

To achieve at least one of the above objects, there is provided an apparatus for discriminating a video tape for programmed recording. The apparatus has a first detection switch for detecting a recording safety tab of the video tape or a first blocking member blocking one side of a tab hole of the video tape and generating a first detection signal. The apparatus also has a second detection switch for detecting the recording safety tab of the video tape or a second blocking member blocking the other side of the tab hole of the video tape and generating a second detection signal. A determining means in the apparatus receives the first detection signal and the second detection signal and determines whether the video tape is a programmed recording tape according to the first detection signal and the second detection signal.

An additional apparatus is also provided, to achieve at least one of the above objects, which discriminates a video tape for programmed recording. The apparatus has a first detection switch for detecting a recording safety tab of the video tape or a first blocking member attached to block one side of a tab hole of the video tape and generating a first detection signal. The apparatus also has a second detection switch for detecting the recording safety tab of the video tape or a second blocking member attached to block the other side of the tab hole of the video tape and generating a second detection signal. A combination voltage generator of the apparatus receives the first detection signal and the second detection signal to output a combination voltage. A microprocessor is included in the apparatus to receive the combination voltage and determining whether the video tape is programmed recording tape based on the combination voltage.

To achieve one of the above objects, a programmed recording method is provided for use with a video cassette recorder. The method comprises the steps of:

(a) determining whether there is a TV program designated for a programmed recording;

(b) determining whether a video tape loaded in the video cassette recorder is a tape for programmed recording if it is determined that there is a TV program designated for a programmed recording in the step (a); and (c) searching a position at which the previous programmed recording ended and standing by for a next programmed recording at the position if it is determined that the loaded tape is a tape for programmed recording in the step (b).

According to the present invention, a video cassette recorder can discriminate a tape for at least of one kind of programmed recording. Further, a television program to be program-recorded is recorded continuously on an appropriate video tape.

BRIEF DESCRIPTION OF THE DRAWINGS

The above objects and advantages of the present invention will become more apparent by describing in detail preferred embodiments thereof with reference to the attached drawings in which.

DESCRIPTION OF THE PREFERRED EMBODIMENTS

Figure 1:
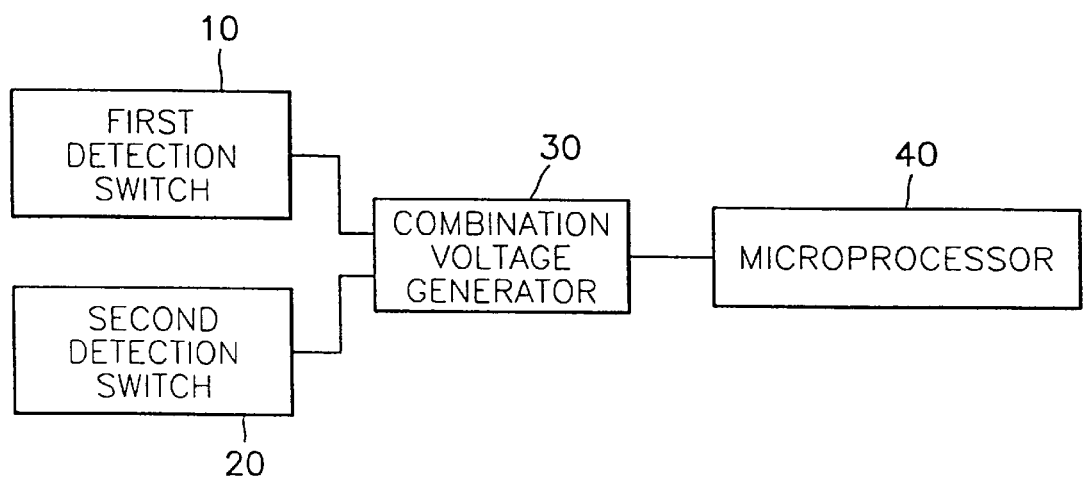
FIG. 1 is a block diagram of an embodiment of an apparatus for discriminating a tape for programmed recording according to the present invention.

FIG. 1 is a block diagram of an embodiment of an apparatus for discriminating a tape for programmed recording according to the present invention, which can discriminate a video tape for daily programmed recording.

The apparatus of FIG. 1 includes a first detection switch 10, a second detection switch 20, a combination voltage generator 30, and a microprocessor 40.

The first detection switch 10 is actuated either by a recording safety tab (not shown) being present in tab hole 60, or by an adhesive tape 70 attached to block one of the right and left sides of a tab hole 60. When the first detection switch 10 is actuated, it generates a first detection signal. The tab hole 60 is the portion of a video tape 50 from which the recording safety tab (not shown) has been removed.

The second detection switch 20 is actuated either by a recording safety tab being present in tab hole 60, or an adhesive tape 70 attached to block the other side of the tap hole 60. When the second detection switch 20 is actuated, it generates a second detection signal.

The combination voltage generator 30 receives the first and second detection signals and generates a combination voltage based on those signals.

The microprocessor 40 receives the combination voltage output by the combination voltage generator 30 and determines whether the video tape is for daily programmed recording.

Then, the operation of the apparatus shown in FIG. 1 will be described in detail with reference to FIGS. 2A and 2B.

Figure 2A:
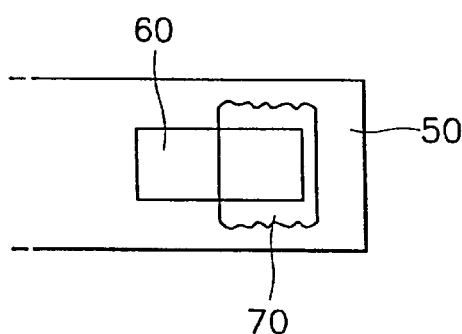
FIG. 2A shows the end of a video tape case with a piece of adhesive tape attached to block the right side of the safety tab hole from which the recording safety tab has been removed to indicate the tape as being a daily programmed recording tape, as may be determined by the apparatus of FIG. 1.
Figure 2B:
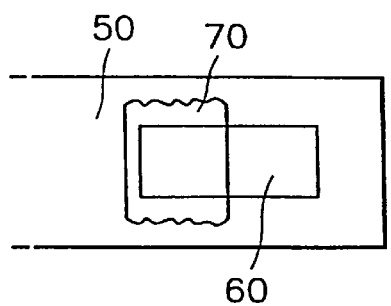
FIG. 2B shows the end of a video tape case with a piece of adhesive tape attached to block the left side of the safety tab hole from which the recording safety tab has been removed to indicate the tape as being a daily programmed recording tape, as may be determined by the apparatus of FIG. 1.

FIG. 2A shows the tab hole 60 of a video tape for daily programmed recording with a piece of adhesive tape 70 attached to block the right half portion of the tab hole 60. It is understood that the tab hole 60 is open because the safety tab (not shown) has been removed. FIG. 2B also shows the tape hole 60 of a video tape for daily programmed recording. The video tape of FIG. 2B differs from the video tape of FIG. 2A in that a piece of adhesive tape 70 attached to block the left half portion of the tab hole 60, rather than the right half. The placement of the pieces of adhesive tape 70 over the tab hole 60 (from which the recording safety tab has been removed) is useful with the apparatus of FIG. 1.

In order that a given video tape is discriminated as one for daily programmed recording in the apparatus of FIG. 1, a piece of blocking tape or adhesive tape is attached on one half of the tap hole. On the other hand, when the tape is to be recording-protected, the recording safety tap is removed and no adhesive tape is attached on the tab hole. Alternatively, when the tape is intended to be used freely for recording (without regard to programming), the recording safety tab is left in place or a piece of adhesive tape is attached to cover the entirety (i.e., both halves) of the tab hole.

Assume that a video tape has been loaded into a video cassette recorder in which the apparatus of the present invention is incorporated, and that a daily programmed recording mode is set.

The first detection switch 10 generates the first detection signal, which has "HIGH" state when the switch 10 is actuated by being depressed and which has "LOW" state when the switch 20 is not being depressed.

The second detection switch 20 generates the second detection signal, which has "HIGH" state when the switch 20 is actuated by being depressed and which has "LOW" state when the switch 20 is not depressed.

The combination voltage generator 30 receives the first and second detection signals and generates a combination voltage according to such signals as shown in a following TABLE 1, which lists the first and second sensing voltages output by the first and second detection switches 10 and 20 and the resultant combination voltage output by the combination voltage generator 30.

TABLE 1

| First Detection Signal | Second Detection Signal | Combination Voltage |
|---|---|---|
| HIGH | HIGH | HIGH |
| HIGH | LOW | MEDIUM |
| LOW | HIGH | MEDIUM |
| LOW | LOW | LOW |

When both the first and second detection signals have "HIGH" state, the combination voltage has "HIGH" state. When one of the first and second detection signals has "HIGH" state while the other one has "LOW" state, the combination voltage has "MEDIUM" state. When both the first and second detection signals have "LOW" state, the combination voltage has "LOW" state. Thus, in this embodiment the combination voltage generator 30 is a three-state logic circuit.

The microprocessor 40 determines that the loaded tape is a freely-recordable one when it receives the combination voltage of "HIGH" state, that the loaded tape is one for daily programmed recording when it receives the combination voltage of "MEDIUM" state, and that the loaded tape is recording-protected when it receives the combination voltage of "LOW" state.

To summarize, in the case that the recording safety tab has been left in place or a piece of adhesive tape has been attached to cover both halves of the tab hole, both the first and the second detection switches 10 and 20 are depressed causing them to both generate "HIGH" state detection signals. Thus, the combination voltage generator 30 receives the first and second detection signals and generates a combination voltage of "HIGH" state, and the microprocessor 40 determines that the loaded tape is a freely-recordable one.

In the case that the recording safety tab is removed and a piece of adhesive tape is attached to cover only one half (left or right) of the tab hole, only one of the first and the second detection switches 10 and 20 is depressed by contact with the adhesive tape 70. Therefore, the one of the detection switches 10 and 20 which is being depressed generates the detection signal of "HIGH" state while the other one generates the detection signal of "LOW" state. Thus, the combination voltage generator 30 receives the first and second detection signals and generates a combination voltage of "MEDIUM" state, and the microprocessor 40 determines that the loaded tape is one for daily programmed recording.

Meanwhile, in the case that the recording safety tab is removed and no adhesive tape is attached at the tab hole, none of the first and the second detection switches 10 and 20 is depressed. Thus, the first and the second detection switches 10 and 20 generate the detection signals of "LOW" state. Thus, the combination voltage generator 30 receives the first and second detection signals and generates a combination voltage of "LOW" state, and the microprocessor 40 determines that the loaded tape is recording-protected.

Even though the combination voltage generator 30 is comprised of a three-state logic circuit which outputs one of the three state output levels in the present embodiment, it should be noted that the combination voltage generator 30 may be comprised of a multiplexer which multiplexes the first and second detection signals and generates binary data to output to the microprocessor 40 in an alternative of the above-described embodiment.

Also, in another alternative embodiment, the combination voltage generator can be dispensed with. In this alternative, the microprocessor 40 receives directly (or, indirectly via a latch) the first and second detection signals and determines whether the video tape is for daily programmed recording according to the detection signals.

According to still another alternative embodiment of the invention, video tapes for different types of programmed recording mode can be discriminated. For example, discrimination would be possible between a tape which is for daily programmed recording and a tape which is for weekly programmed recording. In such an alternative embodiment, the microprocessor 40 determines that the loaded tape is one for daily programmed recording when the first detection signal is "HIGH" and the second detection signal is "LOW", and that the loaded tape is one for another programmed recording mode such as weekly programmed recording when the first detection signal is "LOW" and the second detection signal is "HIGH", rather than determining that the loaded tape is one for daily programmed recording for both cases. In embodying this alternative, one half of the tab hole which will be in front of the first detection switch 10 should be blocked if that video tape is intended for daily programmed recording usage, whereas the other half of the tab hole which will be in front of the second detection switch 20 should be blocked if that video tape is intended for use in another programmed recording mode (i.e., weekly, appointed-time, etc.).

Figure 3:
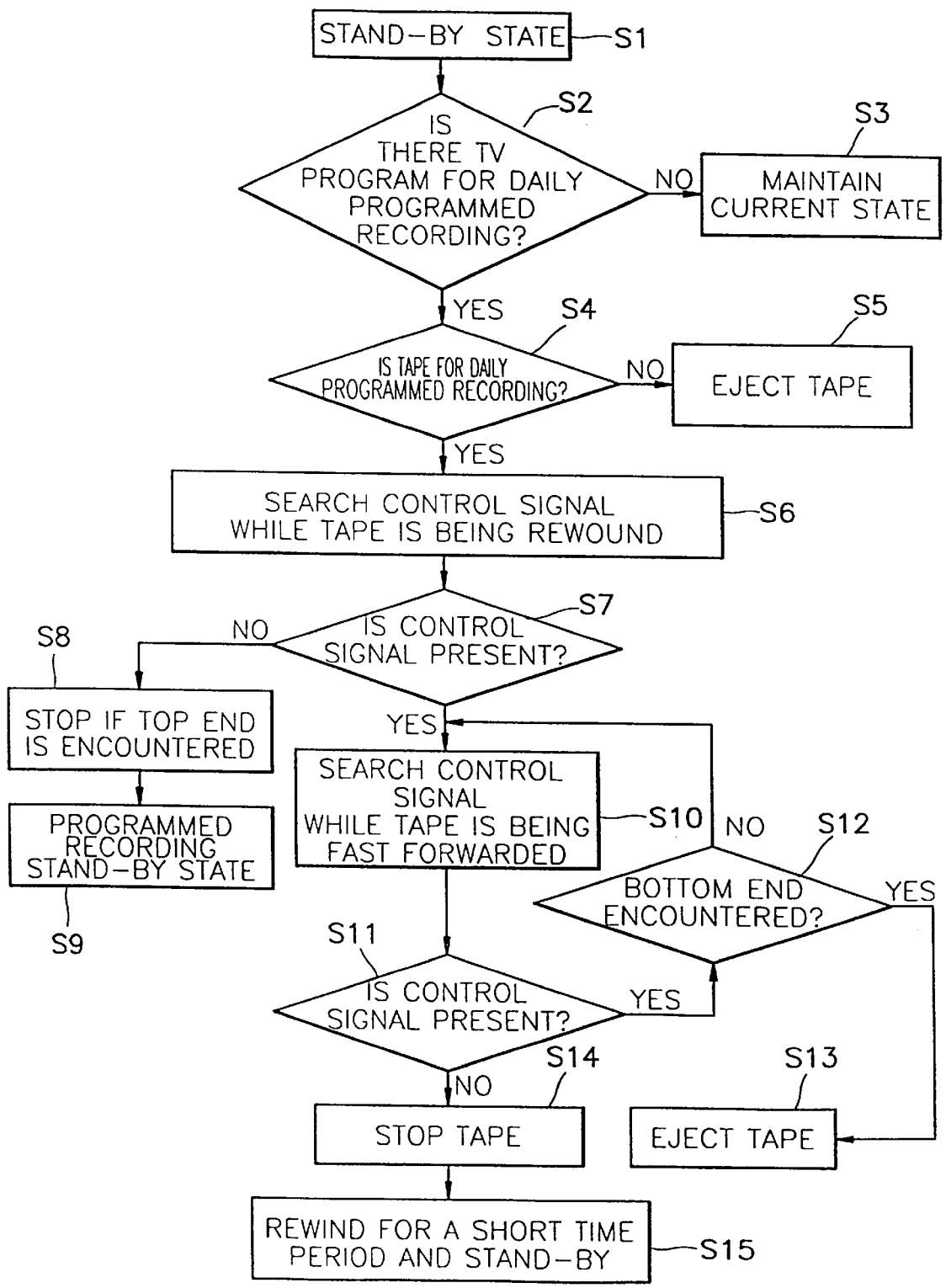
FIG. 3 is a flowchart to illustrate a daily programmed recording method according to the present invention.

FIG. 3 is a flowchart for explaining a recording method according to the present invention, wherein tapes for daily programmed recording are discriminated.

The video cassette recorder will be in a stand-by state when the video cassette recorder is turned off after a programmed recording mode is set and a tape is loaded in the video cassette recorder (step S1). Also, the video cassette recorder will be in the stand-by state after a programmed recording mode is set, when the video cassette recorder is turned on and has a tape loaded in it, but has performed no operation for a predetermined time period.

Then, it is determined (step S2) whether there is a TV program designated for a daily programmed recording. If it is determined that there is no TV program designated for a daily programmed recording in the step S2, the current state, that is, the stand-by state is maintained (step S3).

If it is determined that there is a TV program designated for a daily programmed recording (step S2), it is then determined whether the video tape loaded in the video cassette recorder is one for daily programmed recording by use of the apparatus shown in FIG. 1 (step S4). If it is determined that the loaded tape is not one for daily programmed recording (step S4), the video tape recorder ejects the tape to notify the user that the tape should be replaced with an appropriate tape (step S5).

If it is determined that the loaded tape is one for daily programmed recording (step S4), a position at which the previous programmed recording ended is sought out so that a next programmed recording starts at that position.

For this purpose, a control signal is searched on a control track while the video tape is being rewound, in step S6. Here, the control signal refers to conventional one recorded in a control track positioned on one side of the video tape longitudinally so as to be used by a video head to accurately trace tracks on the video tape. Since the control signal is recorded along with a TV program when the TV program is recorded on the video tape, whether a program is recorded on a particular portion of the video tape can be determined by checking the control signal on the corresponding portion of the video tape. Therefore, if we assume that a series of the TV program is being recorded on a new video tape, the position at which the previous programmed recording ended on the tape can be found by checking the control signal.

In step S7, it is determined whether the control signal exists, while the video tape is being rewound, to determine whether a program is recorded in a portion behind the position of the video tape in which the video head is currently located.

If no control signal exists until the top end (i.e., the beginning end) of the video tape is reached (step S8), the rewinding operation stops. In such case, the video tape is regarded as being a completely new one and the video cassette recorder will be placed in the programmed recording stand-by state at the top end of the video tape (step S9).

If it is determined that the control signal exists in the step S7, the videotape is fast forwarded and the control signal is searched for (step S10).

In step S11, it is determined whether the control signal exists, while the video tape is being fast forwarded, to determine whether a program is recorded in a portion after the position of the video tape in which the video head is currently located.

If it is determined that the control signal exists on the video tape in the step 11, it then is determined whether the bottom end of the tape has been reached (step S12). If the bottom end is not found to be encountered in the step S12, the searching of the control signal continues (steps S10 and S11 are repeated).

If the bottom end is encountered in step S12, that is, the control signal exists from the top end to the bottom end of the video tape, the tape is regarded as a fully recorded one and the video cassette recorded will eject the video tape to notify the user that the tape should be replaced by another one (step S13).

If at step S11 a tape portion is found on which no control signal is recorded, the video cassette recorder stops fast forwarding operation (step S14) since the position at which the previous programmed recording ended has been passed over. At this time, it is preferable that the video cassette recorder rewinds the tape for a short time (step S15) so that recording may commence as nearly as possible to the end position of recording of the previous programmed recording. Then the video cassette recorder will be in the programmed recording stand-by state (step S15). Thus, the programmed recording will begin at the position at which the previous programmed recording ended, so that each of the television programs which are programmed recorded are continuously on the tape.

In an alternative of the above-described embodiment the detection switches are arranged so that blocking tape can be attached on one of a upper and lower sides of the tab hole of the video tape, rather than on one of a left and right sides of the tab hole of the video tape as described above and shown in FIGS. 2A and 2B.

Alternatively, another type of blocking member is substituted for the blocking tape described above. Examples of other useful blocking members are a piece blocking plastic, a piece of aluminum, a piece of paper, etc. These alternative blocking members are attachable to the video tape by friction fit, interference fit, adhesive, or other means as appropriate.

Although the present invention has been described with regard to preferred embodiments, it will be appreciated that various changes and modifications to the described embodiments may be made without departing from the spirit or scope of the invention.

What is claimed is:

1. An apparatus for discriminating a video tape for programmed recording, comprising:

a first detection switch for detecting a recording safety tab of the video tape or a first blocking member attached at a first side of a tab hole of the video tape and generating a first detection signal;

a second detection switch for detecting the recording safety tab of the video tape or a second blocking member attached at a second side of a tab hole of the video tape and generating a second detection signal;

a combination voltage generator, which receives said first detection signal and said second detection signal, for outputting a combination voltage based upon said first detection signal and said second detection signal; and a microprocessor for receiving said combination voltage and determining whether the video tape is a tape for programmed recording based upon said combination voltage, wherein said combination voltage generator comprises a three-state logic circuit.

2. The apparatus for discriminating a video tape for programmed recording as claimed in claim 1, wherein said first side is one of a right and left sides of the tab hole of the video tape.

3. The apparatus for discriminating a video tape for programmed recording as claimed in claim 1, wherein the first side is one of an upper and lower sides of the tab hole of the video tape.

4. The apparatus for discriminating a video tape for programmed recording as claimed in claim 1, wherein said microprocessor determines that the video tape is a programmed recording tape when said combination voltage has a medium level.

* * * * *